United States Patent [19]
Scott et al.

[11] Patent Number: 5,914,438
[45] Date of Patent: Jun. 22, 1999

[54] METHOD AND APPARATUS FOR DELIVERING A COATED GLASS STREAM FOR FORMING CHARGES OF GLASS

[75] Inventors: Garrett L. Scott, Toledo; Jeffery P. Henning, Sylvania, both of Ohio

[73] Assignee: Owens-Brockway Glass Container Inc., Toledo, Ohio

[21] Appl. No.: 09/141,092

[22] Filed: Aug. 27, 1998

Related U.S. Application Data

[62] Division of application No. 08/782,552, Jan. 10, 1997, Pat. No. 5,855,640, which is a continuation of application No. 08/374,372, Jan. 18, 1995, abandoned.

[51] Int. Cl.[6] .......................... C03B 17/00; C03B 17/02
[52] U.S. Cl. .................. 65/121; 65/66; 65/128; 65/145; 65/327; 65/356; 65/374.12; 65/374.13; 65/DIG. 11; 222/146.1; 425/97; 425/133.1
[58] Field of Search .................. 65/29.14, 66, 128, 65/129, 145, 160, 164, 187, 327, 356, 374.12, 374.13, DIG. 11, 382, 412, 444, 491, 492, 499, 502, 121; 222/145.1, 145.7, 145.8, 146.1, 146.2; 425/97, 133.1

[56] References Cited

U.S. PATENT DOCUMENTS

| | | | |
|---|---|---|---|
| 1,605,797 | 11/1926 | Tyson | 65/208 |
| 1,828,217 | 10/1931 | Barker, Jr. | 65/121 |
| 2,765,586 | 10/1956 | Wilson | 65/187 |
| 3,078,695 | 2/1963 | Kozak et al. | 65/183 |
| 3,210,167 | 10/1965 | Lacroix | 428/670 |
| 3,219,426 | 11/1965 | Steer | 65/89 |
| 3,288,583 | 11/1966 | Sheldon | 65/502 |
| 3,291,584 | 12/1966 | Sheldon | 65/488 |
| 3,508,904 | 4/1970 | Keefer | 65/326 |
| 3,531,268 | 9/1970 | Allen | 65/509 |
| 3,554,726 | 1/1971 | Daly | 65/325 |
| 3,582,299 | 6/1971 | Gladwell | 65/508 |
| 3,589,879 | 6/1971 | Yantsev et al. | 65/499 |
| 3,622,289 | 11/1971 | Hansen | 65/492 |
| 3,625,671 | 12/1971 | Schirm et al. | 65/326 |
| 3,960,530 | 6/1976 | Iyengar | 65/447 |
| 4,023,953 | 5/1977 | Megles, Jr. | 65/86 |
| 4,116,621 | 9/1978 | Brassel | 432/233 |
| 4,217,123 | 8/1980 | Titchmarsh | 65/405 |
| 4,299,609 | 11/1981 | Aulich | 65/405 |
| 4,381,932 | 5/1983 | Olson | 65/66 |
| 4,402,724 | 9/1983 | Weisenburger | 65/128 |
| 4,457,771 | 7/1984 | Ambrogi | 65/66 |
| 4,740,401 | 4/1988 | Barkhau et al. | 428/34.6 |
| 5,204,120 | 4/1993 | Hirschberger | 425/132 |
| 5,229,194 | 7/1993 | Lingle et al. | 428/216 |
| 5,433,765 | 7/1995 | Muniz et al. | 65/178 |

FOREIGN PATENT DOCUMENTS

3843425A1  6/1990  Germany.

*Primary Examiner*—Stanley S. Silverman
*Assistant Examiner*—Sean Vincent

[57] ABSTRACT

A method and apparatus for delivering a coated glass stream having a first inner layer and a second outer layer wherein the method comprises providing a vertical orifice, delivering molten glass from a first source through the orifice, providing a gap about the orifice intermediate its upper and lower ends, delivering glass from a second source about the gap such that the glass from the second source flows through the gap to provide an outer layer about the glass from said first source as it flows through the orifice, and controlling the size and shape of the gap parallel to the flow and the size of the gap perpendicular to the flow such that the gap provides sufficient flow resistance and the gap is of sufficient size and shape to prevent clogging. The method includes mounting a metal cooling manifold on a periphery of said pan and extending around said second orifice ring mounting a metal fuel/air manifold mounted on said metal cooling manifold and extending around said second orifice ring, providing a fuel/air combustion chamber between second orifice ring, said pan and said fuel/air manifold, providing a plurality of passage means in said fuel/air manifold opening into said combustion chamber and feeding a fuel air mixture into said combustion chamber, positioning said cooling manifold beneath said fuel/air manifold and directing cooling gas to said cooling manifold so as to cool said pan, said fuel/air manifold and said means carried by said pan.

18 Claims, 8 Drawing Sheets

METHOD AND APPARATUS FOR DELIVERING A COATED GLASS STREAM FOR FORMING CHARGES OF GLASS

This application is a division of application Ser. No. 08/782,552 filed Jan. 10, 1997 now U.S. Pat. No. 5,855,640, which is a continuation of application Ser. No. 08/374,372 filed Jan. 18, 1995 and now abandoned.

This invention relates to a method and apparatus for delivering a glass stream for forming charges of glass and particularly to providing a glass stream to produce a coated glass charge or gob.

BACKGROUND AND SUMMARY OF THE INVENTION

Existing technology for providing a glass coating on a glass stream involve the introduction of multiple glass streams in the forehearth or furnace section of the glass forming operation. This requires new equipment to be installed for the handling of main glass stream as well as the coating glasses.

Typical patents showing such construction, for example, are U.S. Pat. Nos. 1,828,217, 3,291,584, 3,554,726, 3,960,530, 4,023,953, 4,217,123, 4,299,609, 4,381,932, 4,740,401 and 5,204,120.

Another problem with respect to the making of coated glass streams is that relating to orifice rings through which the coated glass passes. In conventional orifice rings, the ceramic orifice ring is held in a metal pan and isolated from the pan by a layer of insulation powder. The orifice ring may be either electrically or gas fired. Gas fired versions have had limited use due to the difficulty in transferring the heat of combustion into the confined area of the orifice ring.

Among the objectives of the invention are to provide a method and apparatus for delivering a coated glass stream for forming charges of glass; wherein the introduction of glass streams is maintained external to the melting, conditioning and delivery systems of the glass manufacturing process; which may be retrofitted to existing installations; and which includes an orifice ring assembly that permits the glass stream to be coated uniformly with a second glass stream.

Among the further objectives of the present invention are to provide a gas-fired orifice ring which supplies controlled high intensity heating to the outer surface of the ring thereby compensating for external heat loss; which yields higher temperatures in the area surrounding the orifice ring and which utilizes ordinary gas-air mixtures.

In accordance with the invention the method comprises delivering a glass stream having a first inner layer and a second outer layer comprising providing a vertical orifice, delivering molten glass from a first source through the orifice, providing a gap about the orifice intermediate its upper and lower ends, delivering glass from a second source about the gap such that the glass from the second source flows through the gap to provide an outer layer about the glass from said first source as it flows through the orifice, and controlling the size and shape of the gap parallel to the flow and the size of the gap perpendicular to the flow such that the gap provides sufficient flow resistance and the gap is of sufficient size and shape to prevent clogging. The method includes the step of providing passages for the flow of the glass from the second source and controlling the size and shape of the passages such that the passages are sufficiently large to minimize flow resistance therein and to provide sufficient pressure to force the glass through the gap and provide less resistance than the metering gap. The method also includes providing a plurality of orifices, each having a gap, delivering glass from the first source through each of the orifices, delivering glass from the second source to the gaps and controlling the size and shapes of such gaps.

The apparatus comprises means for delivering a glass stream having a first inner layer and a second outer layer, means for providing a vertical orifice, means for delivering molten glass from a first source through said orifice, means for providing a gap about said orifice intermediate its upper and lower ends, means for delivering glass from a second source about said gap such that the glass from said second source flows through said gap to provide an outer layer about said glass from said first source as it flows through said orifice, and means for controlling the size and shape of the gap parallel to the flow and the size of the gap perpendicular to the flow such that the gap provides sufficient flow resistance and the gap is of sufficient size and shape to prevent clogging. The apparatus further includes means for providing passages for the flow of the glass from the second source and controlling the size and shape of said passages being such that the passages are sufficiently large to minimize flow resistance therein and to provide sufficient pressure to force the glass through the gap and provide less resistance than said metering gap. The apparatus also includes means for providing a plurality of orifices, each having a gap, means for delivering glass from said first source through each of said orifices, means for delivering glass from said second source to said gaps and means for controlling the size and shapes of such gaps. Specifically, the apparatus comprises an orifice ring assembly which allows one or more glass streams to be coated uniformly with a second glass. The device is constructed in such a way that it (a) delivers the required main stream glass to the glass forming operation, (b) creates a suitable flow resistance to the second glass such that coating is of the proper thickness and uniform, and (c) does not allow glass-refractory particles to become entrained in the system.

In accordance with another aspect of the invention there is provided a gas fired orifice ring that forms a combustion chamber adjacent the underside of the orifice ring such that high temperatures with the combustion ring heat both the periphery and the inner areas surrounding the orifice through which the coated glass stream passes.

DESCRIPTION OF THE PREFERRED EMBODIMENT

Figure 1:
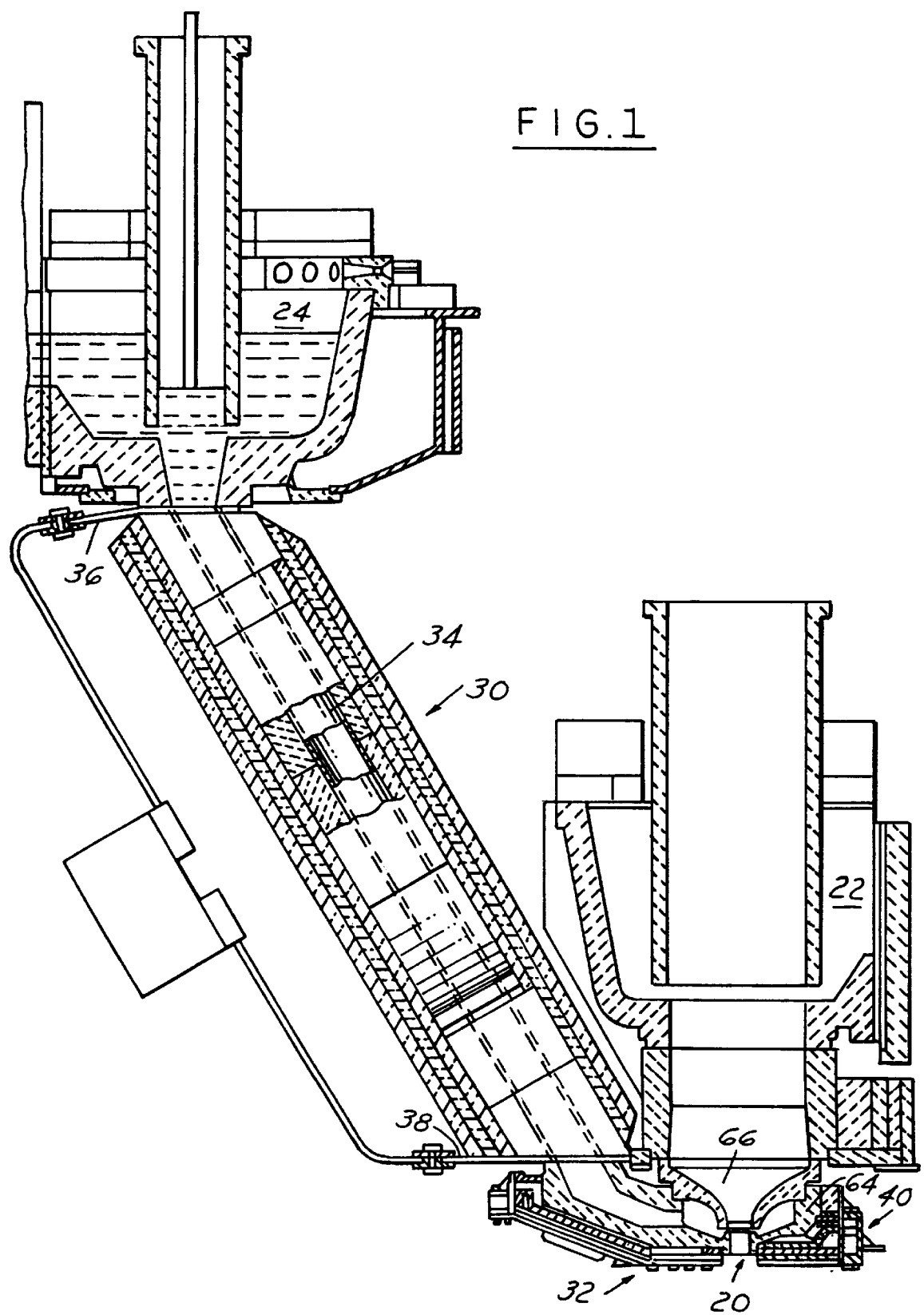
FIG. 1 is a part sectional partly diagrammatic elevational view of a glass system embodying the invention.
Figure 2:
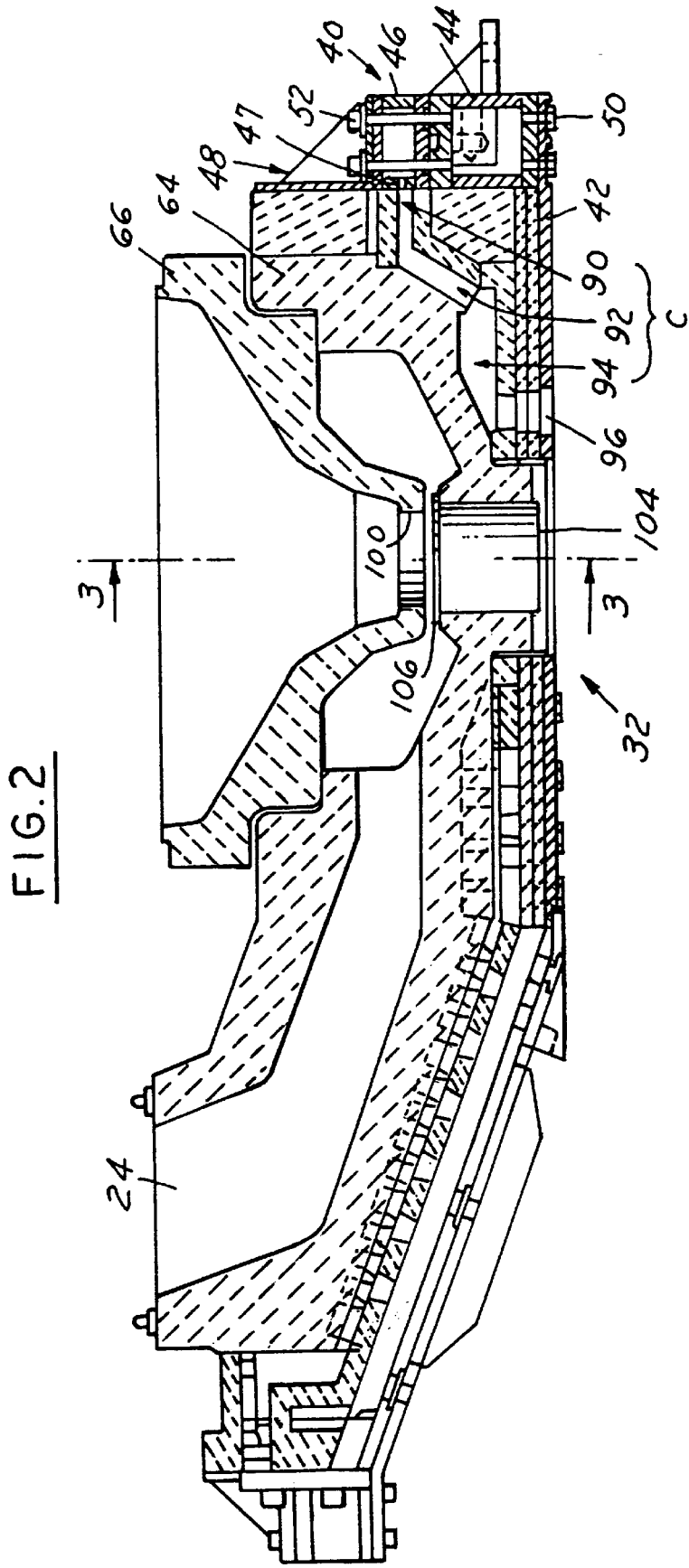
FIG. 2 is a fragmentary sectional view on an enlarged scale of a portion of the system shown in FIG. 1.

Referring to FIG. 1, the invention relates to a method and apparatus for delivering a glass stream comprising a first inner layer and a second outer layer, comprising a generally vertical orifice 20, delivering molten glass from a first source 22 through said orifice 20, and delivering glass from a second source 24 such that the glass from said second source 24 provides an outer layer about the glass from the first source 22 as it flows through said orifice 20. Glass sources 22, 24 comprise conventional forehearths. An electrical resistance heated delivery tube assembly 30 is provided for delivery of glass from the second source 24 through a refractory orifice ring assembly 32 which combines glass from the source 22 and the source 24 to provide a molten glass with a core of glass from source 22 and an outer layer from source 24. The tube assembly 30 includes a tube 34, extending generally vertically, preferably between 19° to 90° from vertical. Upper and lower flanges 36, 38 are secured to the upper and lower ends of said tube 34. The tube 34 and flanges 36, 38 are made of a material that is corrosion resistant and can be electrically resistance heated. Platinum and its alloys are the preferred materials. Other materials can be used such as inconel or molybdenum, but these lack glass corrosion and air oxidation resistance offered by platinum at temperatures normally encountered with molten glass applications.

In operation, it is desired that the tube 34 be heated evenly, but not the flanges 36, 38. This means that the flanges 36, 38 must be a better conductor than the tube 34. One way is to make the overall cross-sectional thickness of the flanges 36, 38 much greater than the tube 34. Another way is to make flanges 36, 38 from a material with a much higher conductivity than the tube 34. Since the tube 34 must carry a high current at high temperatures and provide corrosion resistance to molten glass, it will be difficult to fabricate a tube/flange structure using dissimilar metals. In practice, any type of glass can be used which in its molten state does not exceed the temperatures limit of the alloy of tube 24.

The aforementioned method and apparatus is shown and described in United States patent application Ser. No. 08/374,371 filed Jan. 18, 1995, having a common assignee with the present application, incorporated herein by reference.

Figure 9:
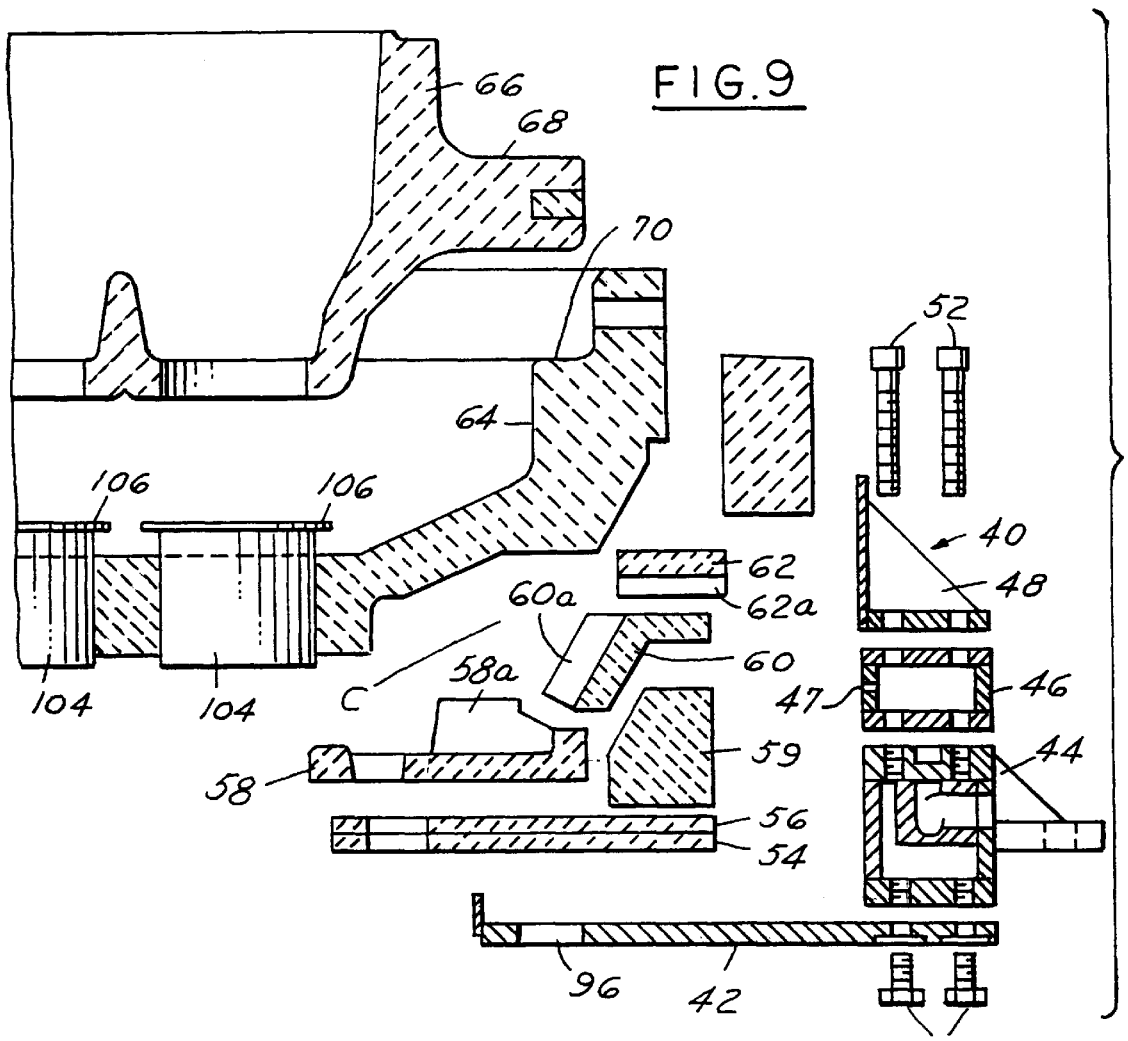
FIG. 9 is an exploded fragmentary view of a portion of the system shown in FIG. 3.

Referring to FIGS. 1–6, in accordance with one aspect of the present invention, the orifice assembly 32 comprises a metal housing assembly 40 including a metal housing pan 42 and three segmented metal tiers 44, 46, 48 about the periphery of the pan 42 (FIG. 9). The pan 42 comprises segments 42a–e. Referring to FIGS. 5–8, the lower tier 44 rests on the periphery of pa n 42 and comprises segments 44a–44g. The intermediate tier 46 rests on the lower tier 44 and comprises segments 46a–g. The upper tier 48 rests on the intermediate tier 46 and comprises segments 48a–g.

The segments in each tier are in abutting relation. The segments 44a–g in the lower tier having a length with respect to the intermediate segments 46a–g of the intermediate tier that the segments 46a–g in the intermediate tier 46 are staggered relative the segments 44a–g in the lower tier 44. Similarly, the segments 48a–g in the upper tier 48 have a length relative to the length of the intermediate segments 46a–g in the intermediate tier 46 that the segments 48a–g are staggered relative to the segments 46a–g of the intermediate tier 46. Bolts 50 extend upwardly through openings in the pan segments of the tier 44 at circumferentially spaced openings and are threaded into the lower tier segments on the pan 42 to retain the segments 42a–g. Bolts 52 extend downwardly through the segments of the upper tier 48 and intermediate tier 46 and are threaded into the segments of the lower tier 44. The housing assembly 40 supports the orifice castings and burner tile. Two layers 54, 56 of insulation board are placed on pan 42. Insulation blocks 59 are cast in place over the periphery of layer 56 and ceramic burner tile 58, 60, 62 are stacked to define a combustion chamber C below the lower surface of a lower orifice ring half 64. Each of the burner tiles 58, 60, 62 includes radial slots or grooves 58a, 60a, 62a as shown in FIG. 9; grooves 58a, 60a facing upwardly and grooves 62a facing downwardly to define long inlet passages 90, 92, 94 to both cool the outer edge adjacent the manifold 46 and preheat the fuel for rapid combustion. An upper orifice ring half 66 has a peripheral flange 68 that engages an annular shoulder 70 on lower orifice ring half 64. The lower surfaces of the lower orifice half 64 serve as an upper wall of the combustion chamber C.

The housing 40 must support the ceramic orifice castings and burner tile which weigh more than 100 pounds compared to 10 pounds or less for a conventional orifice ring. Consequently, the housing assembly 40 is built much heavier than a conventional orifice pan. The housing assembly 40 must be essentially rigid to effectively support the brittle refractories. It must also withstand extremes of temperature to 1800° F. due to the close proximity of the internal combustion chambers.

Temperature differences from the inner to outer wall of the housing 40 are typically 500° F. or more. Because the housing is several feet across in length or width, thermal expansion differences are significant. The separate-segment-concept design allows thermal expansion stresses to dissipate without permanent warpage or buckling. Warpage has proven to damage similar non-segmented orifice housings after one use. The tiers of metal housing segments 42, 44, 46, 48 are stacked horizontally in an overlapping and interlocking fashion, and fastened together with the bolts that are vertically oriented. As thermal expansion occurs, the segments can shift slightly, one with respect to the other preventing a cumulative buildup of stress that would cause buckling. The expansion forces are strong and cause the segments to shift despite the clamping forces of the bolts holding the housing together. Clearances are provided at the ends of the each segment, and around the bolts to prevent binding as the shifting occurs.

Thus four tiers of metal housing segments are as follows from the bottom up:

1. Flat bottom plate segments 42a–e which upwardly support the refractory ceramic parts contained within the housing. The plates 42a–e are segments and contain additional expansion slots 42f (FIG. 5) toward the center to prevent buckling from temperature differences due to the outer edges being below 400° F. and the inner edges being in the range of 1200 to 1600° F.

2. The lower tier 44 of the box beam segments 44a–g which act as support frame and contain air cooling manifold grooves and metering passages.

3. The intermediate tier of box beam segments 46a–g also acts as a fuel supply manifold with metering passages 47. The metering passages on the inner wall align with burner passages in the ceramic tile 60, 62 within.

4. The upper tier 48 of 90 degree angle segments structurally cap the housing and act as a retainer wall for refractory insulation within.

The combustion chamber C includes a horizontal portion 90 that communicates with intermediate tier manifold 46; a downwardly and inwardly extending portion 92 that extends to a horizontal portion 94. Axial combustion exhaust openings 96 are defined by holes in the metal pan 42, insulation board 54, 56 and ceramic burner tile 58.

Figure 3:
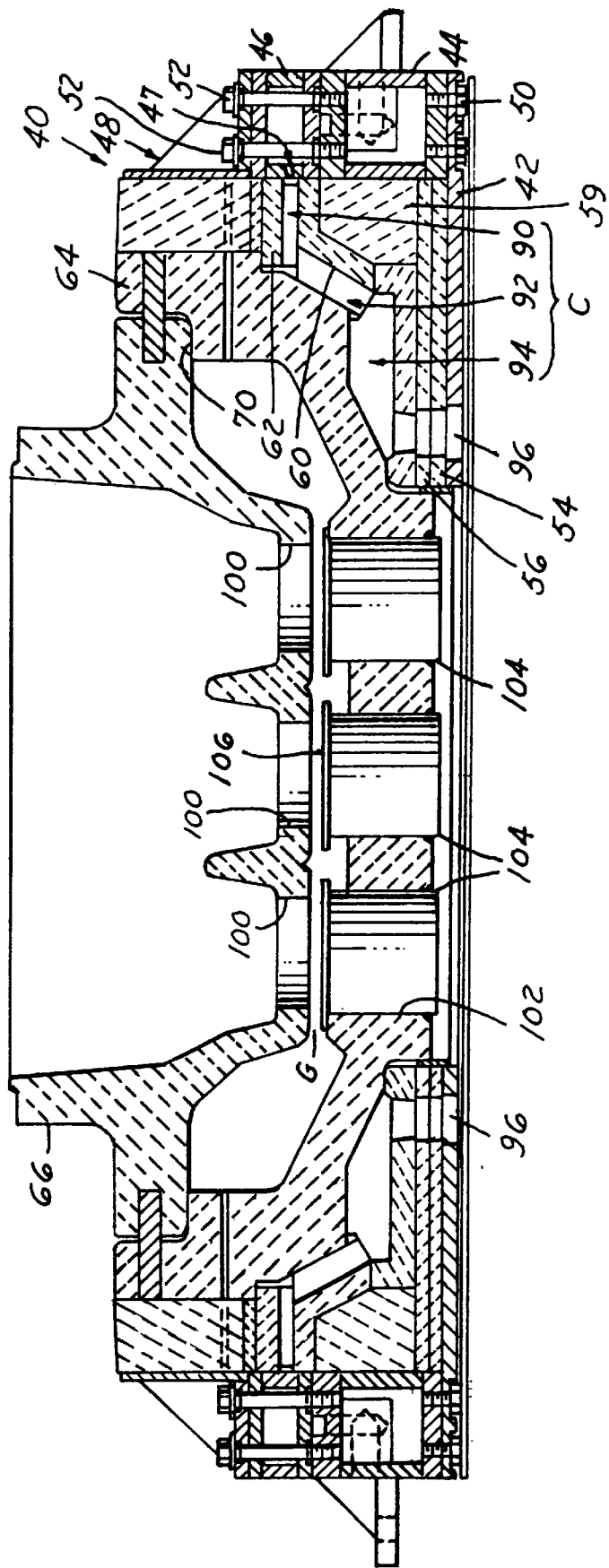
FIG. 3 is a sectional view taken along the line 3—3 in FIG. 2.
Figure 4:
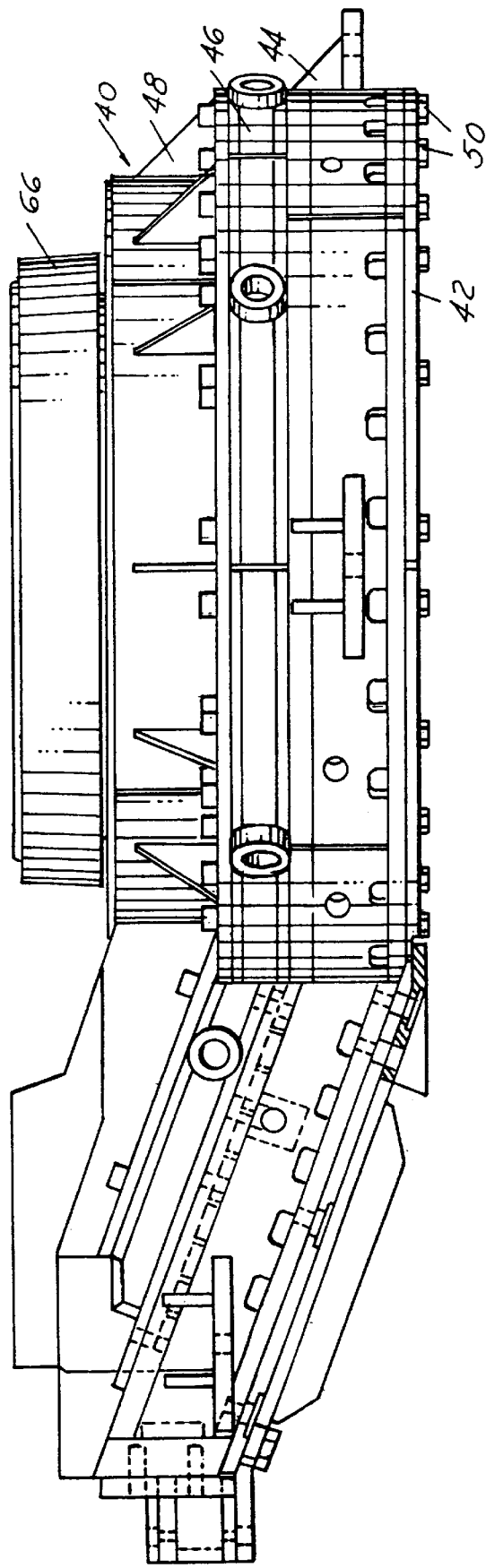
FIG. 4 is a an elevational view of the portion of the system shown in FIG. 2 and FIG. 3.
Figure 5:
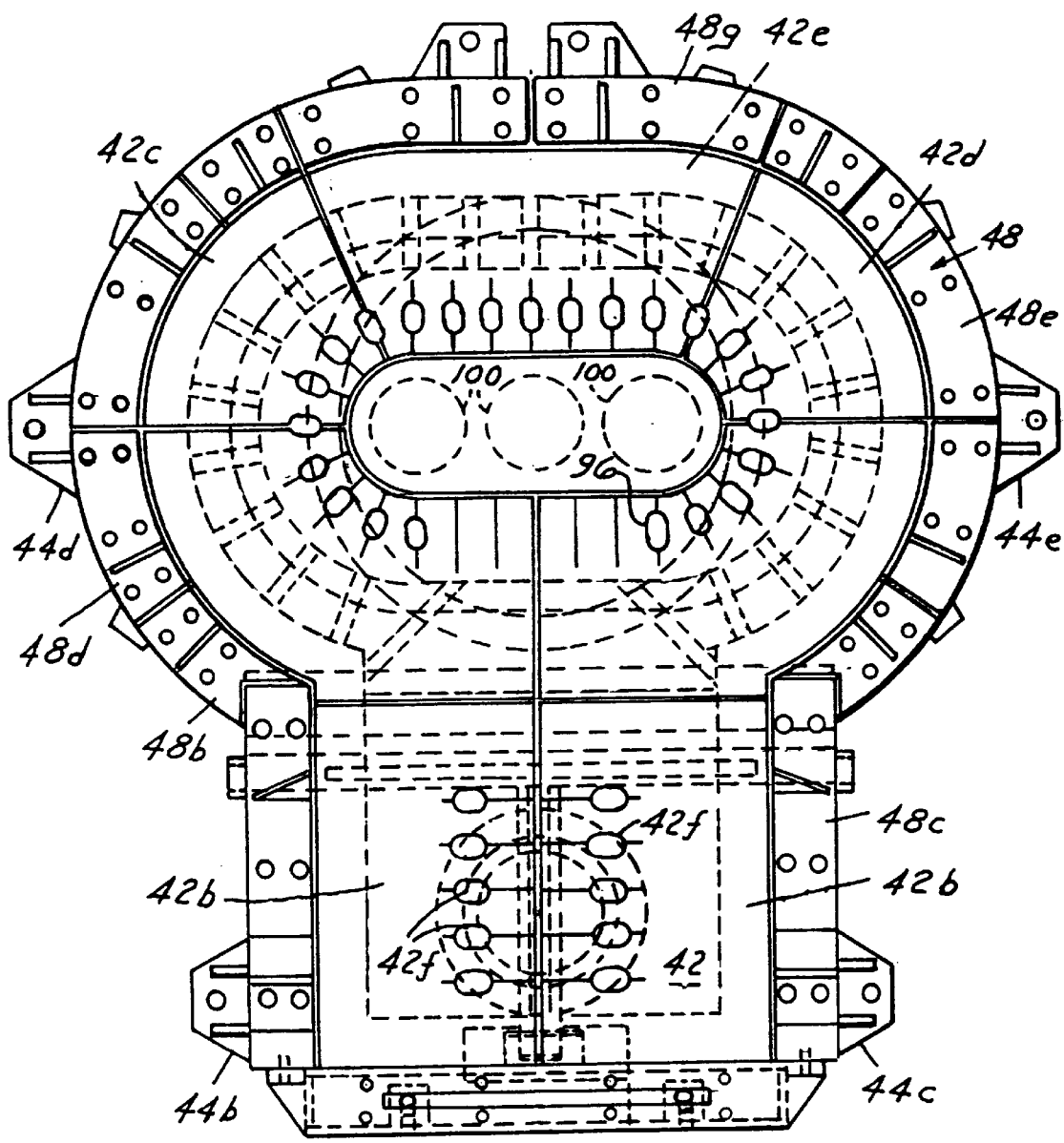
FIG. 5 is a plan view of the portion shown in FIG. 4.
Figure 6:
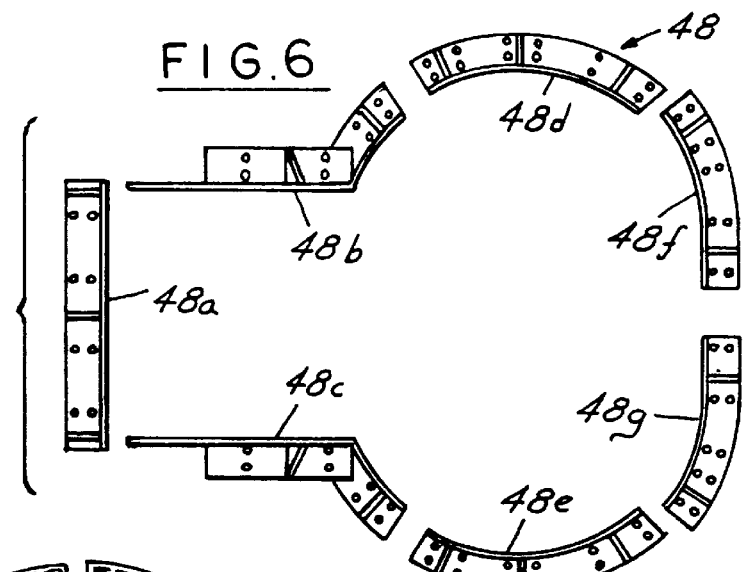
FIGS. 6, 7 and 8 are fragmentary plan views of the portions of the system shown in FIG. 4 and 5, parts being broken away.
Figure 7:
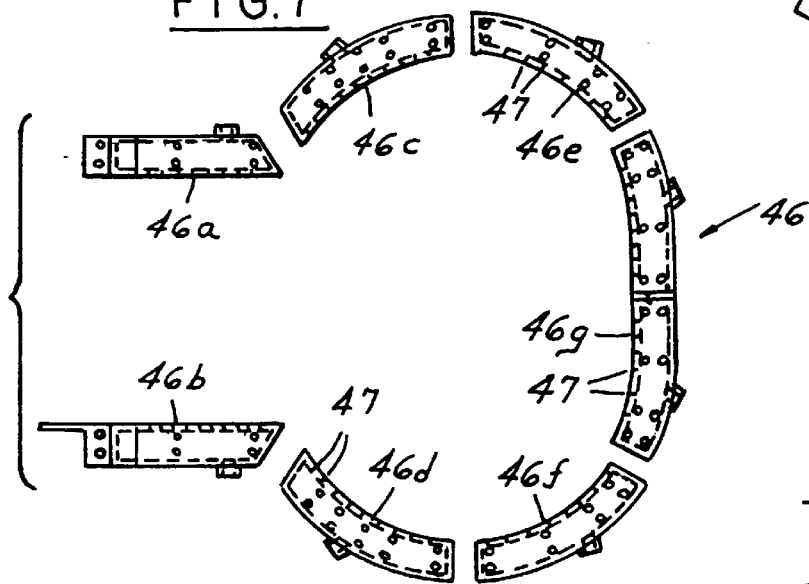
Figure 8:
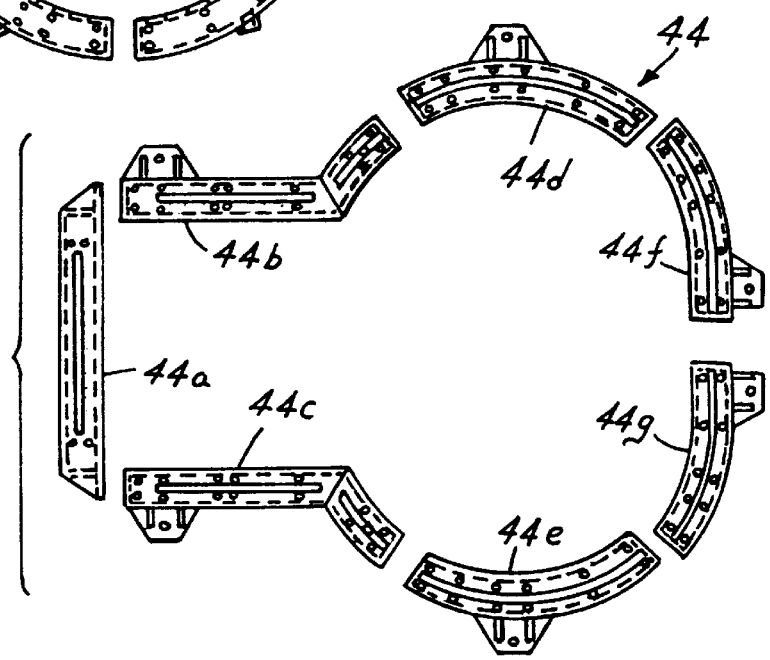

The lower orifice ring half 64 and upper orifice ring half 66 are herein shown as having three orifices defined by aligned upper and lower openings 100, 102 (FIG. 3). Each opening 102 is defined by a bushing 104 having a flange 106 at its upper end.

Figure 12:
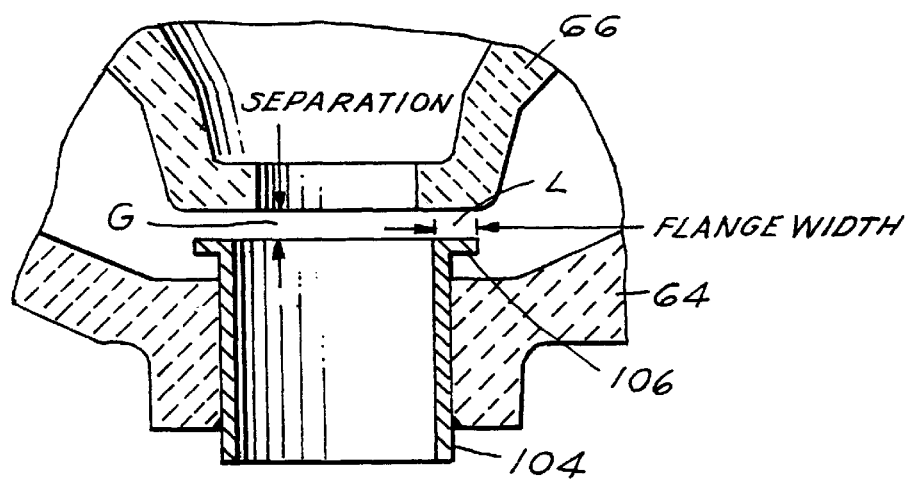
FIG. 12 is a fragmentary part diagrammatic sectional view of a portion of the system shown in FIG. 3.

In accordance with the invention, a gap G is provided between the openings 100 and 102 (FIG. 12). This separation between the openings 100, 102 is chosen to minimize clogging. By mathematical analysis it can be shown that the resistance to flow derives not only from the separation distance G but from the length L of the passage formed by the flange 106. In the present invention, the length L of the passage is the flange width. For example, a narrow separation G and small flange L width can present the same resistance to flow as a wider separation and wider flange provided the correct relationships are maintained.

Therefore, the separation distance G is also chosen in conjunction with the width of the flange L so that the combination of the separation G and flange width L provides flow resistance sufficient to create a uniform inward flow of casing glass at all points circumferentially around each gap. This results in a concentric distribution of the casing layer to the core glass stream.

Figure 10:
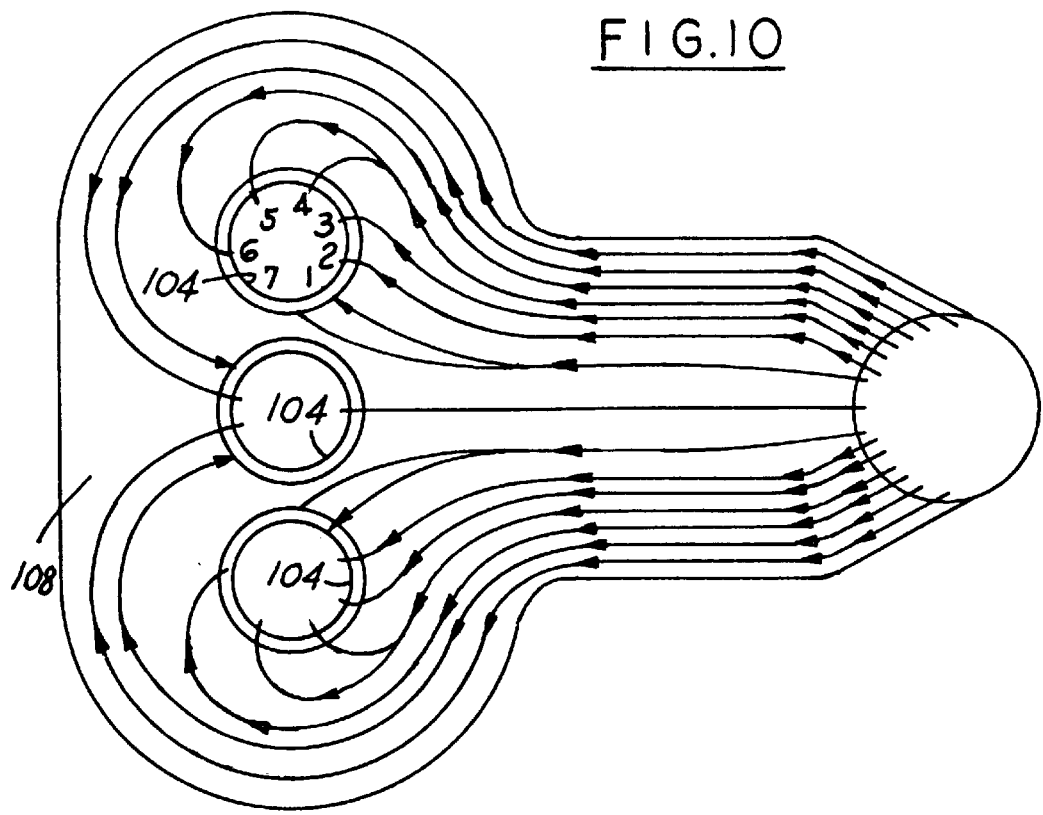
FIG. 10 is a diagrammatic plan view of the flow of the coating glass to the orifices.

Referring to FIG. 10, the casing glass must travel longer distances from the inlet through the supply chamber reach points on the far side of the gap. This additional distance could cause more flow resistance and a reduction of casing glass to the far side. To develop the most uniform and concentric distribution of the casing glass flow around the core glass stream, the design of the metering gap G, the flange width and the supply passages L are chosen in conjunction so that the resistance to flow occurring at the metering gap G is large and the flow resistance within the supply passages is relatively small.

Figure 11:
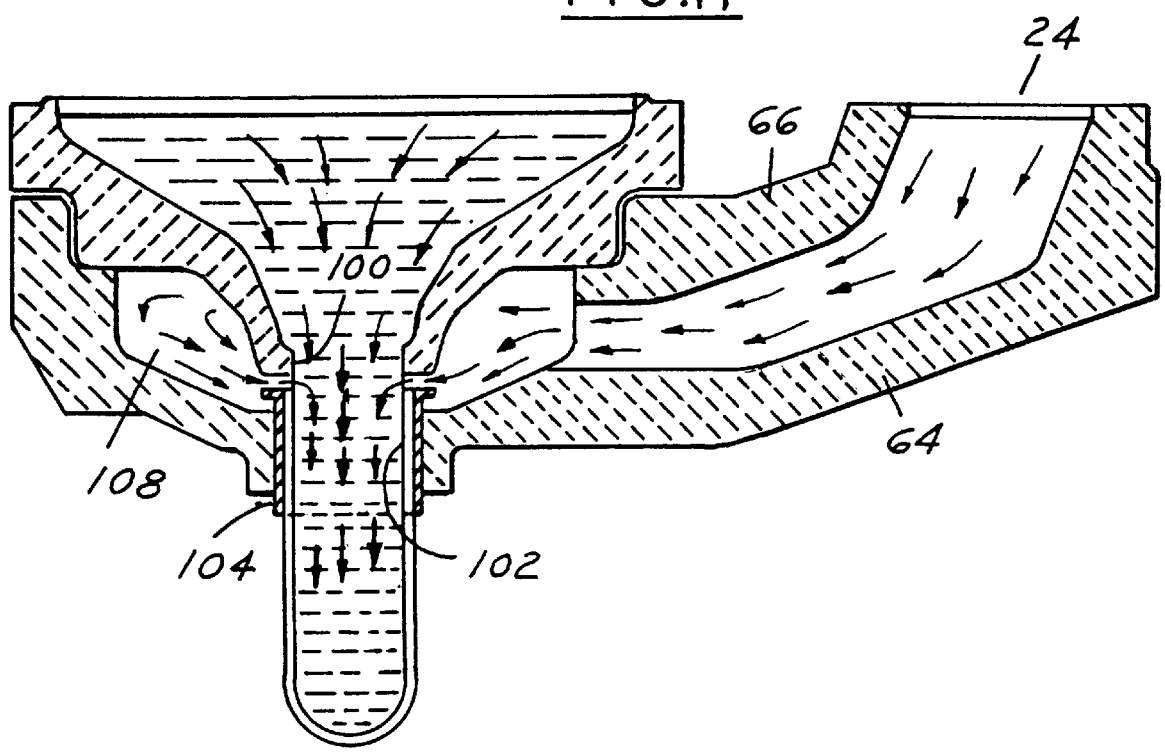
FIG. 11 is a diagrammatic sectional elevational view of the flow of the coating glass onto the stream being coated.

In accordance with the invention, the gap G is provided between the openings 100, and bushing 104 in opening 102. Glass from second source 24 flows into an annular casting glass chamber 108 defined between orifice ring halves 64, 68 (FIG. 11). The glass then flows through the gap G to surround the glass flowing from first source 22 and provide a coated stream of glass that passes downwardly from each opening 102.

Existing glass coating techniques involve the introduction of multiple glass streams in the forehearth or furnace section of the glass forming operation. This requires new equipment to be installed for the handling of main glass stream as well as the coating glasses.

In accordance with the present invention, a single orifice ring assembly and delivery system for the coating glass can be installed and may be retrofitted to existing single glass forming processes. The design allows multiple glass streams to be combined at the last moment before entering the forming machines. This introduction of glass streams is maintained external to the melting, conditioning and delivery systems of the glass manufacturing process and may be retrofitted to existing installations.

Prior existing orifice ring designs may be either electrically or gas fired. Of the gas fired versions, the level of heat input has been relatively low due to the difficulty in transferring the heat of combustion into the confined area of the orifice ring. The design of the orifice ring assembly embodying the invention yields higher temperatures in the area surrounding the orifice ring than previously attainable with gas/air firing. The orifice ring incorporates a ceramic combustion chamber adjacent to the underside of the orifice. The assembly is designed to promote high temperatures within the combustion chamber while using ordinary gas-air mixtures.

In accordance with the invention, a relatively conventional ceramic orifice ring rests upon a second ring of cast ceramic burner tile shapes 58, 60, 62. The underlying ring of tile forms a hollow burner chamber concentrically surrounding the orifice hole. The exposed underside of the upper ring acts as the top surface of the burner chamber so that heat is directly applied to the orifice ring. The burner tile ring is segmented to aid construction and minimize cracking from thermal expansion. The stack of burner tile pieces and overlying orifice ring are held in a metal housing. The relatively heavy metal casing acts as a structural support for the ceramic parts and maintains alignment of the gas supply manifolds with the burner chambers.

Much like a larger furnace, startup of the burner requires a gradual building of fuel input until the combustion chamber becomes incandescent and supports combustion internally. The high temperatures and turbulent flow of the combustion gasses within the chamber promote rapid combustion. A significant portion of the combustion heat is released within the chamber. The high-alumina ceramic chamber lining has a much lower heat transfer rate than a metal liner and consequently develops a higher surface temperature. Additionally the combustion chamber is backed up by insulation to further reduce heat loss and elevate internal temperatures. The internal surfaces of the burner combustion chamber become incandescent during operation and typically reach 2650 degrees Fahrenheit.

The burner chamber ceramic parts are designed to structurally support the orifice ring which is in a soaking heat environment rather than being cool on the outer side. The burner chamber tile contain fuel inlet passages that are relatively long and with abrupt changes in cross-section to cause turbulent flow and impingement of the fuel with the hot ceramic walls for rapid combustion.

The turner manifolds are purposely set as far outboard radially as possible for cooling. The burner tiles are made radially longer than they are high so as to increase the heat transfer path and make the outer edges which contact the manifolds as cool as possible. This minimizes the chance for pre-ignition within the manifolds. The long fuel inlet passages in the burner tile serve to both cool the outer edge adjacent to the manifold and preheat the fuel for rapid combustion.

The present design further includes specific placement of insulation board underneath the burner chamber to both mechanically support the orifice ring inner structure and block heat loss outwardly to the metal casing. The area above the burner chamber and near the orifice ring is three graded layers of ceramic castable cements chosen to provide mechanical support of the orifice ring, bond the burner tile edges to seal off combustion gas leaks, and to provide further insulation to block heat loss around the circumference.

In order to heat the orifice ring, three things must occur:

1. The capacity of gas burner must be sufficiently high to yield the desired heat output.

2. A major portion of the heat must be generated and retained within the orifice ring assembly.

3. Peak temperatures attained must be equal or higher than the glass temperature to offset external losses.

It can thus be seen that there has been provided a method and apparatus for delivering a coated glass stream for forming charges of glass; wherein the introduction of glass streams is maintained external to the melting, conditioning and delivery systems of the glass manufacturing process; which may be retrofitted to existing installations; and which includes an orifice ring assembly that permits the glass stream to be coated uniformly with a second glass stream.

We claim:

1. A method of forming a cased glass stream having an inner core glass surrounded by an outer casing glass, comprising the steps of:

(a) providing a first orifice ring having at least one first orifice, (b) providing a second orifice ring having at least one second orifice, (c) supporting said first and second orifice rings on a metal pan with said first and second orifices in spaced vertical alignment, and with a chamber formed between said first and second orifice rings surrounding said second orifice, (d) mounting a metal cooling manifold on a periphery of said pan and extending around said second orifice ring, (e) mounting a metal fuel/air manifold on said metal cooling manifold and extending around said second orifice ring, (f) providing a fuel air combustion chamber between second orifice ring, said pan and said fuel/air manifold, (g) providing a plurality of passage means in said fuel/air manifold opening into said combustion chamber and feeding a fuel air mixture into said combustion chamber, (h) positioning said cooling manifold beneath said fuel/air manifold and directing cooling gas to said cooling manifold so as to cool said pan, said fuel/air manifold and said means carried by said pan, (i) delivering core glass from a first source through said first orifice, and (j) delivering casing glass from a second source to said chamber such that glass flows by gravity through said orifices from said first and second sources to form the cased glass stream.

2. The method set forth in claim 1 wherein said step (f) comprises forming said combustion chamber between an underside of said second orifice ring and a plurality of burner tiles carried by said pan.

3. The method set forth in claim 2 wherein said combustion chamber is provided in said step (f) as non-aligned passages for promoting turbulence in said fuel/air mixture as it traverses said passages.

4. The method set forth in claim 2 comprising the additional step of: (k) providing insulation means between said burner tiles and said pan, and between said burner tiles and said cooling manifold, said cooling manifold functioning to cool said insulation means, said pan and said fuel/air manifold.

5. The method set forth in claim 4 wherein said burner tiles support a periphery of said second orifice ring with respect to said pan.

6. The method set forth in claim 4 comprising the additional step of: (l) segmenting said pan, said fuel/air manifold and said cooling manifold to accommodate thermal expansion; and wherein segments of said fuel/air manifold, said cooling manifold and said pan are staggered with respect to each other around said second orifice ring.

7. The method set forth in claim 6 further comprising the step of: (m) providing expansion slots in said segmented pan.

8. The method set forth in claim 6 wherein said first and second orifice rings, said cooling manifold, said fuel/air manifold, said burner tiles and said insulation means comprise an integrated assembly supported by said pan, with said insulation means being carried by the pan, said burner tiles being carried by said insulation means, said second orifice ring being carried by said burner tiles and said first orifice ring being carried by said second orifice ring, said insulation means, said burner tiles, said second orifice ring and said first orifice ring being peripherally surrounded and held in place on said pan by said cooling manifold and said fuel/air manifold.

9. The method set forth in claim 8 wherein said metal pan, said metal cooling manifold and said metal fuel/air manifold are interconnected by vertically oriented bolts to permit thermal expansion of said pan and said manifolds with respect to each other around said rings.

10. An orifice assembly for use in apparatus for forming a cased glass stream having an inner core glass surrounded by an outer casing glass, said orifice assembly comprising:

a first orifice ring having at least one first orifice and means for receiving core glass from a first source, a second orifice ring having at least one second orifice and means for receiving casing glass from a second source, means including a metal pan for supporting said first and second orifice rings with said first and second orifices in spaced vertical alignment, and with a chamber formed between said first and second orifice rings surrounding said second orifice, a metal cooling manifold carried by a periphery of said pan and extending around said second orifice ring, a metal fuel/air manifold mounted on said metal cooling manifold and extending around said second orifice ring, and means carried by said pan within said manifolds and cooperating with said second orifice ring to form a fuel/air combustion chamber between second orifice ring, said pan and said fuel/air manifold, said fuel/air manifold having a plurality of passage means opening into said combustion chamber for feeding a fuel air mixture into said combustion chamber, and said cooling manifold disposed beneath said fuel/air manifold functioning to cool said pan, said fuel/air manifold and said means carried by said pan.

11. The orifice assembly set forth in claim 10 wherein said combustion chamber is formed between an underside of said second orifice ring and a plurality of burner tiles carried by said pan.

12. The orifice assembly set forth in claim 11 wherein said combustion chamber comprises non-aligned passages for promoting turbulence in said fuel/air mixture as it traverses said passages.

13. The orifice assembly set forth in claim 11 wherein said means carried by said pan further comprises insulation means disposed between said burner tiles and said pan, and between said burner tiles and said cooling manifold, said cooling manifold functioning to cool said insulation means, said pan and said fuel/air manifold.

14. The orifice assembly set forth in claim 13 wherein said burner tiles support a periphery of said second orifice ring with respect to said pan.

15. The orifice assembly set forth in claim 13 wherein said pan, said fuel/air manifold and said cooling manifold are all segmented to accommodate thermal expansion; and wherein segments of said fuel/air manifold, said cooling manifold and said pan are staggered with respect to each other around said second orifice ring.

16. The orifice assembly set forth in claim 15 further comprising expansion slots in said segmented pan.

17. The orifice assembly set forth in claim 15 wherein said insulation means is carried by the pan, said burner tiles are carried by said insulation means, said second orifice ring is carried by said burner tiles and said first orifice ring is carried by said second orifice ring, said insulation means, said burner tiles, said second orifice ring and said first orifice ring being peripherally surrounded and held in place on said pan by said cooling manifold and said fuel/air manifold.

18. The orifice assembly set forth in claim 17 wherein said metal pan, said metal cooling manifold and said metal fuel/air manifold are interconnected by vertically oriented bolts to permit thermal expansion of said pan and said manifolds with respect to each other around said rings.

* * * * *